(12) United States Patent
Fisk et al.

(10) Patent No.: US 9,133,712 B2
(45) Date of Patent: Sep. 15, 2015

(54) BLADE HAVING POROUS, ABRADABLE ELEMENT

(75) Inventors: Benjamin T. Fisk, East Granby, CT (US); Tracy A. Propheter-Hinckley, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 888 days.

(21) Appl. No.: 13/454,295

(22) Filed: Apr. 24, 2012

(65) Prior Publication Data

US 2013/0280049 A1 Oct. 24, 2013

(51) Int. Cl.
F01D 5/20 (2006.01)
F01D 1/02 (2006.01)
F01D 11/12 (2006.01)
B23P 15/02 (2006.01)

(52) U.S. Cl.
CPC .. *F01D 1/02* (2013.01); *F01D 5/20* (2013.01); *F01D 11/122* (2013.01); *B23P 15/02* (2013.01); *Y10T 29/49337* (2015.01)

(58) Field of Classification Search
CPC ............ F01D 1/02; F01D 5/25; F01D 5/147; F01D 11/12; F01D 11/122
USPC .......... 415/168.1, 168.4, 173.1, 173.4, 173.6, 415/174.4; 416/189, 191, 192, 241 R; 29/888.011, 888.02, 888.021, 888.024, 29/889.1, 889.2, 889.21, 889.7
See application file for complete search history.

(56) References Cited

U.S. PATENT DOCUMENTS

| | | | |
|---|---|---|---|
| 2,343,918 A | 5/1943 | McCoy | |
| 3,703,808 A * | 11/1972 | Stearns | 415/173.7 |
| 4,022,481 A * | 5/1977 | Long et al. | 415/174.4 |
| 4,606,699 A * | 8/1986 | Hemsworth | 415/173.1 |
| 4,815,939 A | 3/1989 | Doble | |
| 5,038,014 A | 8/1991 | Pratt et al. | |
| 5,165,860 A | 11/1992 | Stoner et al. | |
| 5,558,497 A | 9/1996 | Kraft et al. | |
| 5,837,960 A | 11/1998 | Lewis et al. | |
| 5,971,710 A * | 10/1999 | Stauffer et al. | 416/191 |
| 6,190,124 B1 | 2/2001 | Freling et al. | |
| 6,223,524 B1 * | 5/2001 | Durcan | 60/226.1 |
| 6,391,251 B1 | 5/2002 | Keicher et al. | |
| 6,669,447 B2 | 12/2003 | Norris et al. | |
| 7,029,232 B2 | 4/2006 | Tuffs et al. | |
| 7,112,044 B2 | 9/2006 | Whitehead et al. | |
| 7,121,800 B2 | 10/2006 | Beattie | |
| 7,121,801 B2 | 10/2006 | Surace et al. | |
| 7,125,225 B2 | 10/2006 | Surace et al. | |
| 7,217,093 B2 | 5/2007 | Propheter et al. | |
| 7,270,517 B2 | 9/2007 | Garner | |
| 7,473,072 B2 | 1/2009 | Malak et al. | |
| 7,478,994 B2 | 1/2009 | Cunha et al. | |
| 7,686,570 B2 | 3/2010 | Allen | |
| 7,857,588 B2 | 12/2010 | Propheter-Hinckley et al. | |

(Continued)

OTHER PUBLICATIONS

International Search Report and Written Opinion for International Application No. PCT/US2013/036738 completed on Sep. 26, 2013.

(Continued)

*Primary Examiner* — Igor Kershteyn
(74) *Attorney, Agent, or Firm* — Carlson, Gaskey & Olds, P.C.

(57) ABSTRACT

A blade includes an airfoil having a base and a free, tip end. The tip end includes at least one porous, abradable element.

20 Claims, 4 Drawing Sheets

(56) References Cited

U.S. PATENT DOCUMENTS

| | | | |
|---|---|---|---|
| 2002/0145258 A1* | 10/2002 | Nava et al. | 277/415 |
| 2005/0129511 A1 | 6/2005 | Allen | |
| 2008/0008581 A1 | 1/2008 | Pilecki | |
| 2009/0214352 A1* | 8/2009 | Ochiai et al. | 416/241 R |
| 2009/0258168 A1 | 10/2009 | Barcock et al. | |
| 2009/0304497 A1 | 12/2009 | Meier et al. | |
| 2011/0048664 A1 | 3/2011 | Kush et al. | |
| 2013/0045091 A1* | 2/2013 | Della-Fera et al. | 415/174.4 |

OTHER PUBLICATIONS

International Preliminary Report on Patentability for PCT Application No. PCT/US2013/036738, mailed Nov. 6, 2014.

* cited by examiner

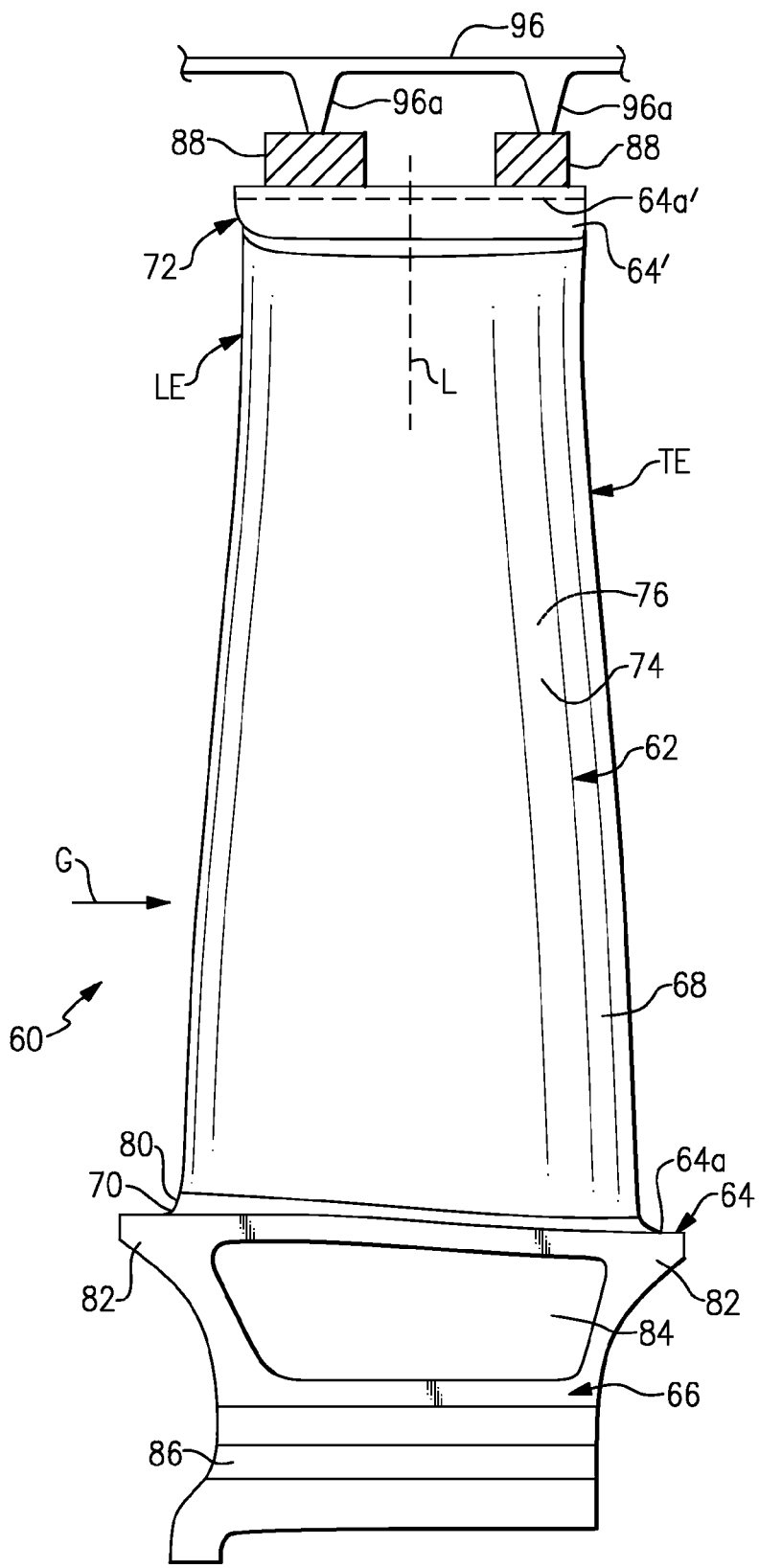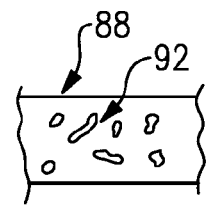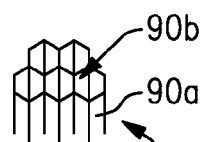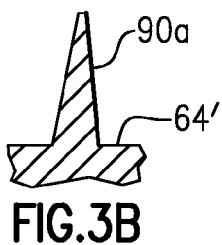

BLADE HAVING POROUS, ABRADABLE ELEMENT

BACKGROUND

This disclosure relates to an airfoil, such as an airfoil for a gas turbine engine.

Turbine, fan and compressor airfoil structures are typically manufactured using die casting techniques. For example, the airfoil is cast within a mold that defines an exterior airfoil surface. A core structure may be used within the mold to form impingement holes, cooling passages, ribs or other structures in the airfoil. The die casting technique inherently limits the geometry, size, wall thickness and location of these structures. Thus, the design of a traditional airfoil is limited to structures that can be manufactured using the die casting technique, which in turn may limit the performance of the airfoil.

SUMMARY

A blade according to an exemplary aspect of the present disclosure includes an airfoil that has a base and a free, tip end. The tip end includes at least one porous, abradable element.

In a further non-limiting embodiment of the above example, the tip end includes a platform and at least one porous, abradable element is on the platform.

In a further non-limiting embodiment of any of the foregoing examples, the at least one porous, abradable element includes a first porous, abradable element and a second porous, abradable element that define sides of a channel, with the platform defining a bottom of the channel and the channel having an open top opposite the bottom.

In a further non-limiting embodiment of any of the foregoing examples, the at least one porous, abradable element includes a honeycomb.

In a further non-limiting embodiment of any of the foregoing examples, the honeycomb has cell walls that are tapered.

In a further non-limiting embodiment of any of the foregoing examples, at least one porous, abradable element includes a random array of pores.

In a further non-limiting embodiment of any of the foregoing examples, the at least one porous, abradable element includes geometric pores.

In a further non-limiting embodiment of any of the foregoing examples, the at least one porous, abradable element includes a first porous, abradable element and a second porous, abradable element spaced apart from the first porous, abradable element.

In a further non-limiting embodiment of any of the foregoing examples, the first porous, abradable element and the second porous, abradable element are elongated along the same direction and offset from each other along the direction.

In a further non-limiting embodiment of any of the foregoing examples, the at least one porous, abradable element has a first composition and the airfoil has a second composition that is equivalent to the first composition.

In a further non-limiting embodiment of any of the foregoing examples, the at least one porous, abradable element has a first composition and the airfoil has a second composition that is different than the first composition.

A turbine engine according to an exemplary aspect of the present disclosure includes, optionally a fan, a compressor section, a combustor in fluid communication with the compressor section, and a turbine section in fluid communication with the combustor. The turbine section is coupled to drive the compressor section and the fan. At least one of the fan, the compressor section and the turbine section includes a plurality of blades. Each of the plurality of blades has an airfoil that includes a base and a free, tip end. The tip end includes at least one porous, abradable element.

A further non-limiting embodiment of any of the foregoing examples includes a static shroud extending circumferentially around the plurality of blades adjacent the porous, abradable elements, and the static shroud includes at least one edge extending circumferentially and radially inwardly toward the porous, abradable elements.

In a further non-limiting embodiment of any of the foregoing examples, at least one edge is circumferentially continuous over multiple ones of the plurality of blades.

A method for processing a blade according to an exemplary aspect of the present disclosure includes depositing multiple layers of a powdered metal onto one another, joining the layers to one another with reference to data relating to a particular cross-section of a blade, and producing the blade with an airfoil including a base and a free, tip end. The tip end includes at least one porous, abradable element.

A method for processing a blade according to an exemplary aspect of the present disclosure includes providing a blade having an airfoil including a base and a free, tip end, and forming at the tip end at least one porous, abradable element.

A further non-limiting embodiment of any of the foregoing examples includes prior to the forming, removing a prior porous, abradable element from the tip end.

In a further non-limiting embodiment of any of the foregoing examples, the removing includes machining the tip end to form a flat surface.

In a further non-limiting embodiment of any of the foregoing examples, the forming includes forming the at least one porous, abradable element on the flat surface.

In a further non-limiting embodiment of any of the foregoing examples, the forming includes depositing multiple layers of a powdered metal on to one another and joining the layers to one another with reference to data relating to a particular cross-section of the at least one porous, abradable element.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 shows a perspective view of an airfoil.

FIG. 3A shows a honeycomb of a porous, abradable element.

FIG. 3B shows a cross-section through a honeycomb that has cell walls that are tapered.

FIG. 3C shows a porous, abradable element with a random array of pores.

FIG. 7 shows a perspective view of a tip end of an airfoil having an opening there through.

DETAILED DESCRIPTION OF THE PREFERRED EMBODIMENT

Figure 1:
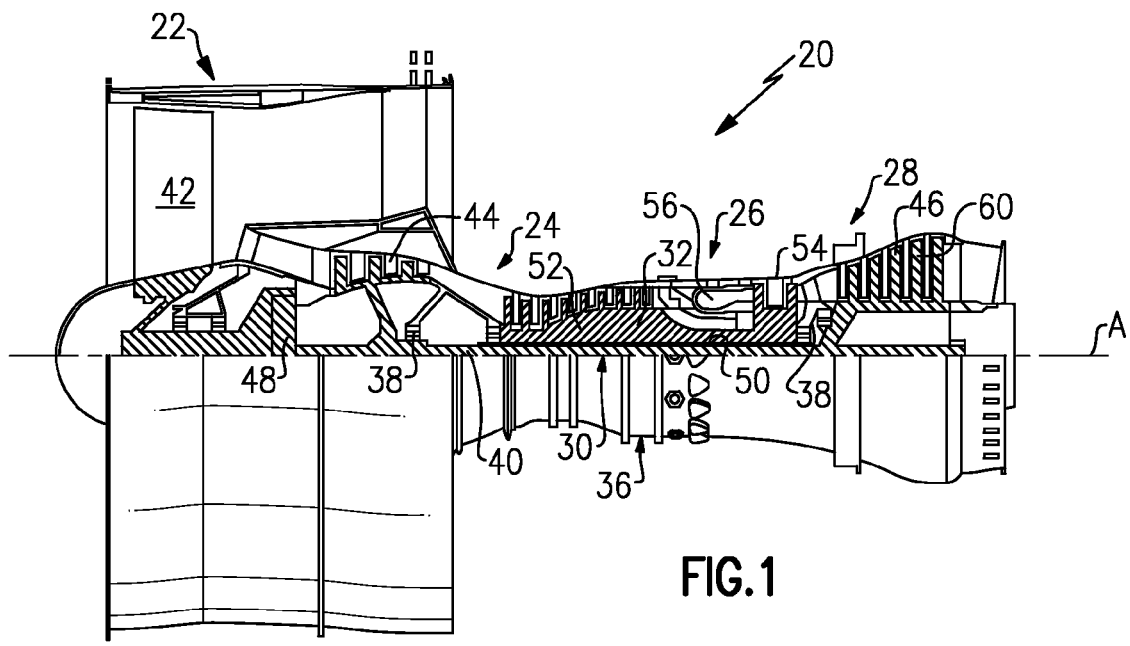
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 may be connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

FIG. 2 illustrates an example airfoil 60. In this example, the airfoil 60 is a turbine blade of the turbine section 28. The airfoil 60 may be mounted on a turbine disk in a known manner with a plurality of like airfoils. Alternatively, it is to be understood that although the airfoil 60 is depicted as a turbine blade, the disclosure is not limited to turbine blades and the concepts disclosed herein are applicable to compressor blades in the compressor section 24, fan blades in the fan section 22 or any other blade structures. Thus, some features that are particular to the illustrated turbine blade are to be considered optional.

The airfoil 60 includes an airfoil portion 62, a platform 64 and a root 66. The platform 64 and the root 66 are particular to the turbine blade and thus may differ in other airfoil structures or be excluded in other airfoil structures.

The airfoil 60 includes a body 68 that defines a longitudinal axis L between a base 70 at the platform 64 and a tip end 72. The longitudinal axis L in this example is perpendicular to the engine central axis A. The body 68 includes a leading edge (LE) and a trailing edge (TE) and a first side wall 74 (suction side) and a second side wall 76 (pressure side) that is spaced apart from the first side wall 74. The first side wall 74 and the second side wall 76 join the leading edge (LE) and the trailing edge (TE).

The airfoil portion 62 connects to the platform 64 at a fillet 80. The platform 64 connects to the root 66 at buttresses 82. The root 66 generally includes a neck 84 and a serration portion 86 for securing the airfoil 60 in a disk.

It should be understood that relative positional terms such as "forward," "aft," "upper," "lower," "above," "below," "circumferential," "radial" and the like are with reference to the normal operational attitude and engine central axis A, unless otherwise indicated. Furthermore, with reference to the engine 20, the tip end 72 of the airfoil 60 is commonly referred to as the outer diameter of the airfoil 60 and the root 66 is commonly referred to as the inner diameter of the airfoil 60. The platform 64 includes an upper surface 64a that bounds an inner diameter of a gas path, generally shown as G, over the airfoil portion 62. In this example, the tip end 72 of the airfoil body 68 includes another platform 64' that bounds the diametrically outer region of the gas flow G.

In the illustrated example, the tip end 72 of the airfoil body 68 includes at least one porous, abradable element 88. The term "abradable" as used in this disclosure refers to a structure that is less abrasive than another, more abrasive structure which rubs against the less abrasive structure such that the less abrasive structure will be worn away at a greater rate than the more abrasive structure.

In this example, the airfoil body 68 includes two such porous, abradable elements 88. It is to be understood, however, that airfoil body 68 may include only a single porous, abradable element 88 that extends partially or fully across the tip end 72, or a greater number of porous, abradable elements 88. The one or more porous, abradable elements 88 are fixed on the platform 64'.

In one example, the porous, abradable element 88 has a regular, geometric structure, such as the honeycomb 90 shown in FIG. 3A. The honeycomb 90 includes cell walls 90a that are configured in a hexagonal pattern, although other patterns of regular porosity could be used. The cell walls 90a define open, geometric pores 90b. As shown in cross-section in FIG. 3B, the cell walls 90a of the honeycomb 90 are tapered and have a thicker base at the platform 64' that tapers to a thinner portion at the distal end. The tapering thus defines a frustoconical shape of the pores 90b. The tapering of the cell walls 90a permits the distal ends of the cell walls 90a to be more easily worn away in comparison to portions of the cell walls 90a that are closer to the platform 64'. Additionally, the thicker base of the cell walls 90a strengthen the honeycomb 90. Thus, the tapering can be used to tailor the abradabilty and strength of the porous, abradable elements 88.

Alternatively, the porous, abradable element 88 has a random array of pores 92, as shown in FIG. 3C. The random array of pores 92 may form a closed porosity or an open, interconnected porosity.

The porous, abradable element 88 of any of the above examples has a first composition and the airfoil body 68 has a second composition. The first composition can be the same or different than the second composition with respect to the chemical elements and amounts of chemical elements present. In one example, the compositions are equivalent and are both nickel-based alloys. In another example, the composition of the porous, abradable element 88 is a different nickel-alloy composition than the airfoil body 68, a different metallic alloy than the airfoil body 68 or is a non-metallic material.

Figure 4:
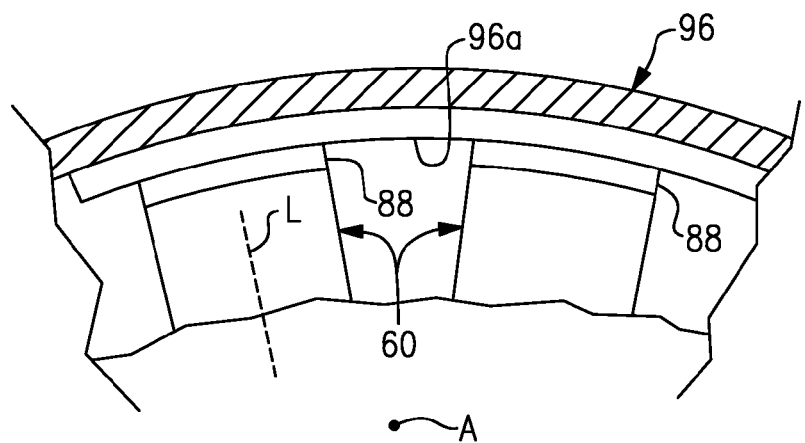
FIG. 4 shows a plurality of airfoil blades and a static shroud circumferentially extending around the airfoil blades.

As pointed out above, the airfoil 60 may be a blade within the fan section 22, the compressor section 24 or the turbine section 28. Generally, the airfoils 60 are mounted on disk in a known manner such that the disk includes a plurality of the airfoils 60 circumferentially mounted around the periphery of the disk. As shown in FIG. 4, a static shroud 96 extends circumferentially around the airfoils 60 adjacent the porous, abradable elements 88. The static shroud 96 includes at least one edge 96a (e.g., a "knife" edge), that extends circumferentially and radially inwardly with regard to the engine longitudinal axis A toward the porous, abradable elements 88. The static shroud 96 may include several edges 96a that are axially offset from each other.

In operation of the engine 20, the airfoils 60 rotate around the engine central axis A such that the porous, abradable elements 88 contact the edge 96a of the static shroud 96. Because the porous, abradable elements 88 are porous, the edge 96a or edges, which are generally solid, wear a groove in the porous, abradable elements 88. The interaction between the edge 96a and the porous, abradable elements 88 thus provides a dynamic seal between the moving airfoils 60 and the static shroud 96. Traditionally, due to manufacturing limitations in die casting techniques used to form airfoils, such edges are provided on the tip ends of airfoils and porous elements are provided on the static shroud. However, if edges on the airfoils 60 are circumferentially misaligned, the groove formed in the porous elements on the shroud becomes enlarged and thus provides less sealing. By instead of providing the porous, abradable elements 88 on the airfoils 60, the edge 96a can be made circumferentially continuous over multiple airfoils 60, as shown in FIG. 4, and controlled within a tight dimensional tolerance to provide a tighter groove that enhances sealing. The static shroud 96 is also easier to manufacture in comparison to shrouds that have porous elements due to elimination of assembly of a porous element on the static shroud 96.

Figure 5:
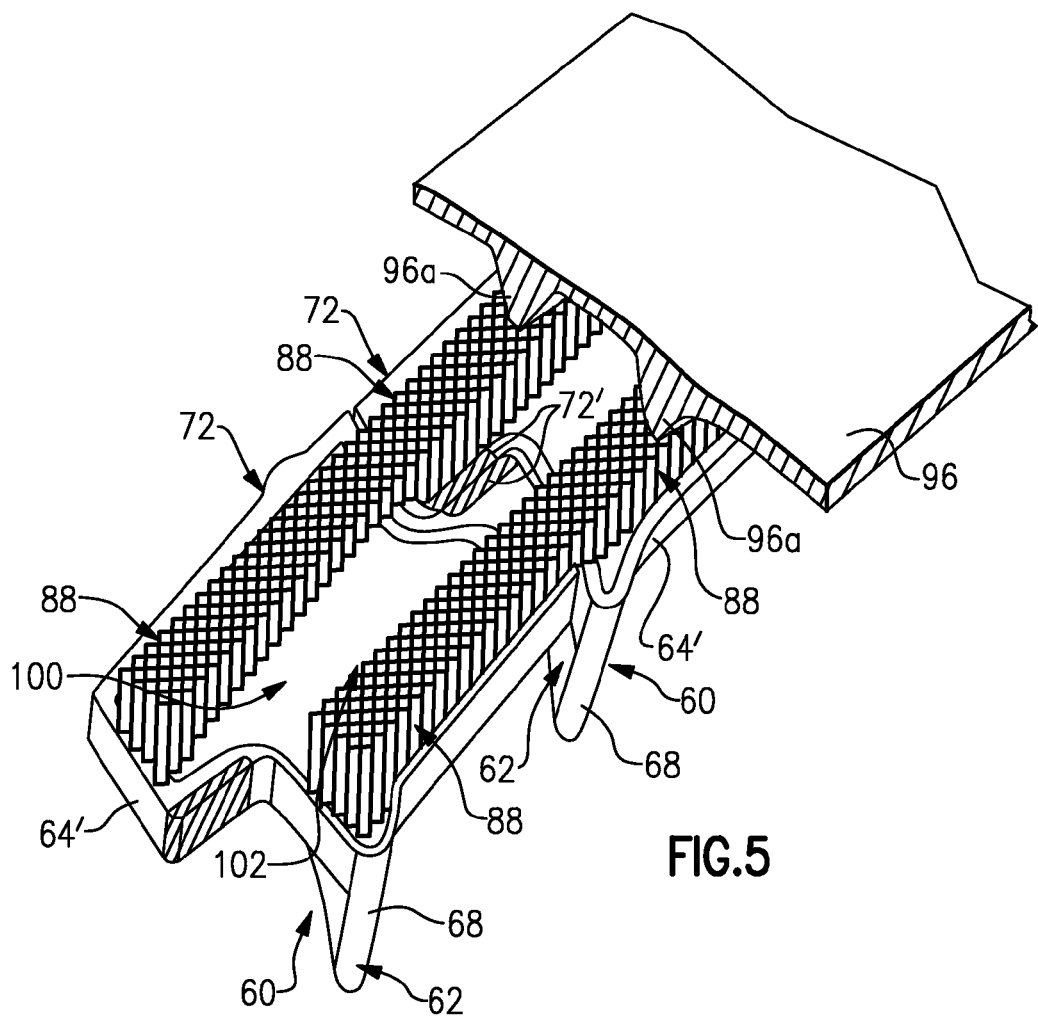
FIG. 5 shows a cutaway view of a static shroud and airfoil blades having porous, abradable elements.

FIG. 5 shows a perspective view with a portion of the static shroud 96 cutaway to reveal several airfoils 60 at their tip ends 72. The platforms 64' of the tip ends 72 interlock at bearing surfaces 72' such that the porous, abradable elements 88 on each tip end circumferentially align. The porous, abradable elements 88 are elongated along the circumferential direction and are axially spaced apart from each other to form sides of a channel 100 there between. The porous, abradable elements 88 on each of the platforms 64' are also circumferentially offset from each other. The platforms 64' form a bottom of the channel, which is opposite of an open top 102 of the channel 100.

Figure 6:
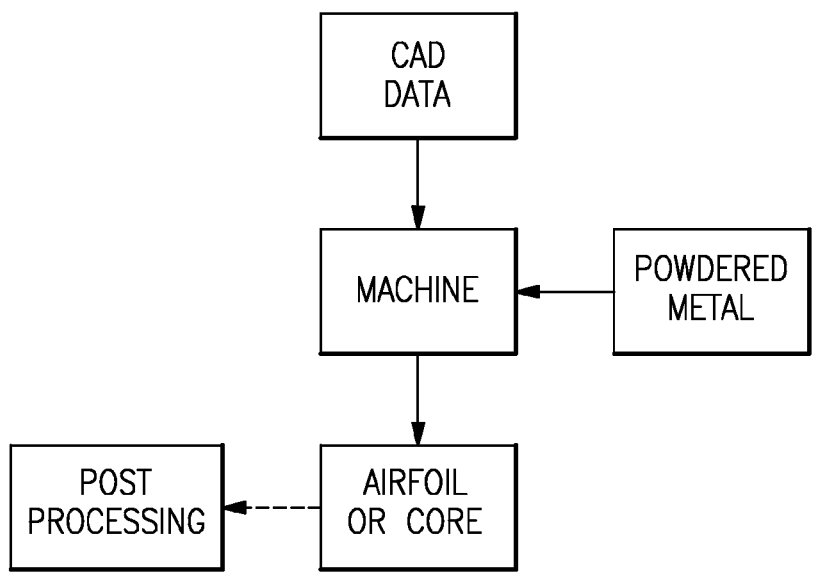
FIG. 6 shows a method of processing an airfoil.

The geometries disclosed herein, such as, but not limited to, the tapered cell walls 90a of the honeycomb 90, may be difficult to form using conventional casting technologies. Thus, a method of processing an airfoil having the features disclosed herein includes an additive manufacturing process, as schematically illustrated in FIG. 6. Powdered metal suitable for aerospace airfoil applications is fed to a machine, which may provide a vacuum, for example. The machine deposits multiple layers of powdered metal onto one another. The layers are selectively joined to one another with reference to Computer-Aided Design data to form solid structures that relate to a particular cross-section of the airfoil. In one example, the powdered metal is selectively melted using a direct metal laser sintering process or an electron-beam melting process. Other layers or portions of layers corresponding to negative features, such as cavities, openings or porosity, are not joined and thus remain as a powdered metal. The unjoined powder metal may later be removed using blown air, for example. With the layers built upon one another and joined to one another cross-section by cross-section, an airfoil or portion thereof, such as for a repair, with any or all of the above-described geometries, may be produced. The airfoil may be post-processed to provide desired structural characteristics. For example, the airfoil may be heated to reconfigure the joined layers into a single crystalline structure.

Additionally, the method may be used as a retrofit or a repair of the porous, abradable elements 88. In one example, the method is used to form the porous, abradable elements 88 on a prior-existing airfoil that does not originally include such elements. In another example, the method is used as a repair to rebuild worn porous, abradable elements 88. For example, the worn, porous, abradable elements are machined down to a flat surface, such as the flat top surface of the platform 64'. Once machined to a flat surface, a new porous, abradable element 88 can be built upon the flat surface using the method described above. Alternatively, a new porous, abradable element 88 can be built separately and then attached, such as by brazing, to the flat surface.

In a further example, the platform 64' is provided with a sacrificial layer 64a' (FIG. 2) that can be partially machined away along with a worn, porous, abradable element. The sacrificial layer 64a' has a predefined longitudinal thickness. As long as at least a portion of the sacrificial layer 64a' remains after machining away a worn, porous, abradable element, the airfoil 60 meets dimensional requirements. However, once the sacrificial layer 64a' is completely machined away, such as after several repairs and rebuilds of the porous, abradable element 88, the complete consumption of the sacrificial layer 64a' indicates that the airfoil 60 does not meet dimensional requirements and should no longer be repaired, for example.

Figure 7:
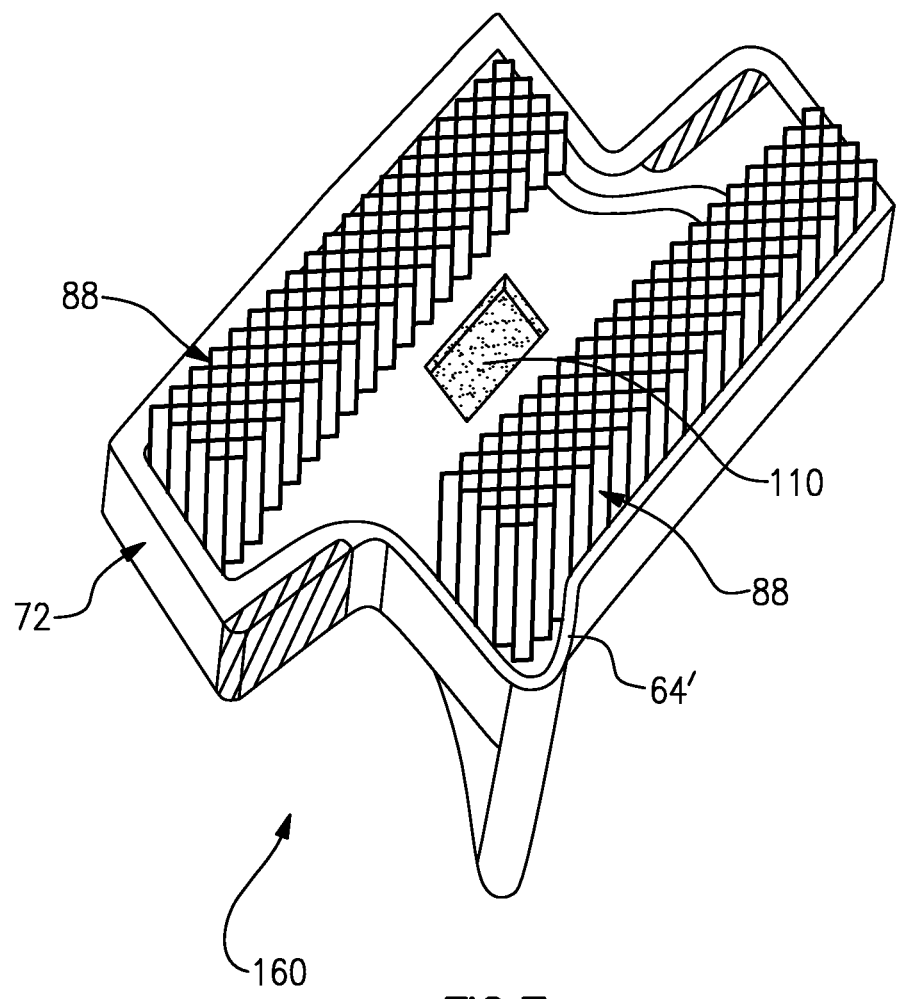

FIG. 7 shows a perspective view of a tip end 172 of a modified airfoil 160. In this disclosure, like reference numerals designate like elements where appropriate and reference numerals with the addition of one-hundred or multiples thereof designate modified elements that are understood to incorporate the same features and benefits of the corresponding elements. In this example, the tip end 172 includes an opening 110 between the porous, abradable elements 88. The opening 110 opens to an internal cavity within the airfoil 160. Functionally, the opening 110 allows removal of any loose powder material remaining in the internal cavity of the airfoil after or during the manufacturing process described above. The opening 110 may later be sealed over or may remain open.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A blade comprising:
   an airfoil including a base and a free, tip end, the tip end including at least one porous, abradable element that includes a honeycomb that has cell walls that are tapered in wall thickness.

2. The blade as recited in claim 1, wherein the tip end includes a platform and the at least one porous, abradable element is on the platform.

3. The blade as recited in claim 2, wherein the at least one porous, abradable element includes a first porous, abradable element and a second porous, abradable element that define sides of a channel, with the platform defining a bottom of the channel and the channel having an open top opposite the bottom.

4. The blade as recited in claim 1, wherein the at least one porous, abradable element includes a random array of pores.

5. The blade as recited in claim 1, wherein the at least one porous, abradable element includes geometric pores.

6. The blade as recited in claim 1, wherein the at least one porous, abradable element includes a first porous, abradable element and a second porous, abradable element spaced apart from the first porous, abradable element.

7. The blade as recited in claim 6, wherein the first porous, abradable element and the second porous, abradable element are elongated along the same direction and offset from each other along the direction.

8. The blade as recited in claim 1, wherein the at least one porous, abradable element has a first composition and the airfoil has a second composition that is equivalent to the first composition.

9. The blade as recited in claim 1, wherein the at least one porous, abradable element has a first composition and the airfoil has a second composition that is different than the first composition.

10. The blade as recited in claim 1, wherein the cell walls taper away from the tip.

11. The blade as recited in claim 1, wherein the tip end includes a platform and the at least one porous, abradable element is on the platform, and the cell walls have a thicker base at the platform that tapers to a thinner portion at a distal end thereof.

12. A turbine engine comprising:
optionally, a fan;
a compressor section;
a combustor in fluid communication with the compressor section; and
a turbine section in fluid communication with the combustor, the turbine section being coupled to drive the compressor section and the fan, and
at least one of the fan, the compressor section and the turbine section including a plurality of blades, each of the plurality of blades having an airfoil including a base and a free, tip end, the tip end including at least one porous, abradable element that includes a honeycomb that has cell walls that are tapered in wall thickness.

13. The turbine engine as recited in claim 12, further including a static shroud extending circumferentially around the plurality of blades adjacent the porous, abradable elements, and the static shroud includes at least one edge extending circumferentially and radially inwardly toward the porous, abradable elements.

14. The turbine engine as recited in claim 13, wherein the at least one edge is circumferentially continuous over multiple ones of the plurality of blades.

15. A method for processing a blade, the method comprising:
depositing multiple layers of a powdered metal onto one another;
joining the layers to one another with reference to data relating to a particular cross-section of a blade; and
producing the blade with an airfoil including a base and a free, tip end, the tip end including at least one porous, abradable element that includes a honeycomb that has cell walls that are tapered in wall thickness.

16. A method for processing a blade, the method comprising:
providing a blade having an airfoil including a base and a free, tip end; and
forming at the tip end at least one porous, abradable element that includes a honeycomb that has cell walls that are tapered in wall thickness.

17. The method as recited in claim 16, further including, prior to the forming, removing a prior porous, abradable element from the tip end.

18. The method as recited in claim 17, wherein the removing includes machining the tip end to form a flat surface.

19. The method as recited in claim 18, wherein the forming includes forming the at least one porous, abradable element on the flat surface.

20. The method as recited in claim 16, wherein the forming includes depositing multiple layers of a powdered metal on to one another and joining the layers to one another with reference to data relating to a particular cross-section of the at least one porous, abradable element.

* * * * *